US011373316B2

(12) United States Patent
Jung

(10) Patent No.: US 11,373,316 B2
(45) Date of Patent: Jun. 28, 2022

(54) APPARATUS AND METHOD FOR CALCULATING MOTION VECTOR

(71) Applicant: HANWHA TECHWIN CO., LTD., Seongnam-si (KR)

(72) Inventor: Gab Cheon Jung, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 228 days.

(21) Appl. No.: 16/742,077

(22) Filed: Jan. 14, 2020

(65) Prior Publication Data

US 2021/0035308 A1  Feb. 4, 2021

(30) Foreign Application Priority Data

Aug. 2, 2019 (KR) .......................... 10-2019-0094121

(51) Int. Cl.
*G06T 7/246* (2017.01)
*G06T 5/00* (2006.01)
*G06T 5/50* (2006.01)

(52) U.S. Cl.
CPC .............. *G06T 7/246* (2017.01); *G06T 5/003* (2013.01); *G06T 5/50* (2013.01); *G06T 2207/10144* (2013.01); *G06T 2207/20201* (2013.01); *G06T 2207/20208* (2013.01)

(58) Field of Classification Search
CPC ........... G06T 7/246; G06T 5/003; G06T 5/50; G06T 2207/20208; G06T 2207/10144; G06T 2207/20201; G06T 2207/20224; G06T 5/009; H04N 5/144; H04N 5/23277
See application file for complete search history.

(56) References Cited

U.S. PATENT DOCUMENTS

| 6,864,916 | B1 | 3/2005 | Nayar et al. |
| 7,548,689 | B2 * | 6/2009 | Yap .......................... G03B 7/08 |
| | | | 396/234 |
| 9,118,840 | B2 * | 8/2015 | Fukunishi .......... H04N 5/35581 |
| 10,002,436 | B2 * | 6/2018 | Yamada ............... H04N 5/2353 |
| 2012/0038793 | A1 * | 2/2012 | Shimizu ................. H04N 5/353 |
| | | | 348/231.99 |
| 2019/0132518 | A1 * | 5/2019 | Kon .................... H04N 5/23229 |

FOREIGN PATENT DOCUMENTS

| JP | 2009-65350 A | 3/2009 |
| JP | WO2007/129533 A1 | 9/2009 |
| KR | 10-0892972 B1 | 4/2009 |
| KR | 10-2009-0111065 A | 10/2009 |
| KR | 10-2016-0061612 A | 6/2016 |

* cited by examiner

*Primary Examiner* — Phuoc Tran
(74) *Attorney, Agent, or Firm* — Sughrue Mion, PLLC

(57) ABSTRACT

Provided an apparatus for obtaining a motion vector including at least one processor configured to receive a long exposure image and a short exposure image of the current frame, and obtain a motion vector of the long exposure image and a motion vector of the short exposure image, the processor being configured to extract feature points in the long exposure image based on a saturation degree of the long exposure image, and obtain a motion vector of the long exposure image based on a difference from a long exposure image of a previous frame, and the processor being configured to extract feature points in the short exposure image and obtain a motion vector of the short exposure image based on a difference from a short exposure image of a previous frame based on a saturation degree of the short exposure image.

20 Claims, 16 Drawing Sheets

FIG. 7
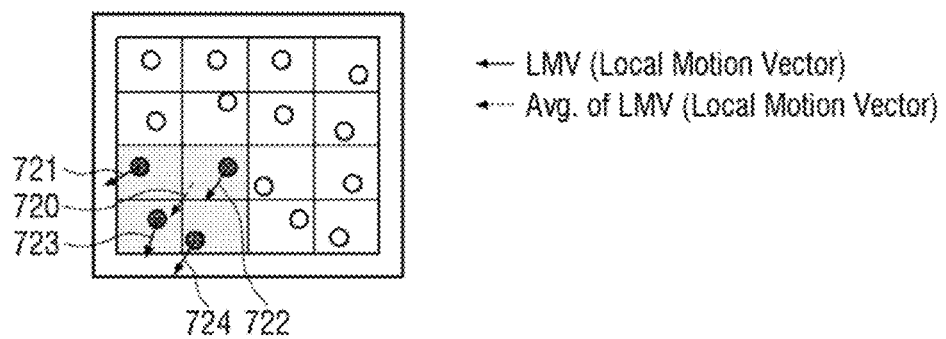
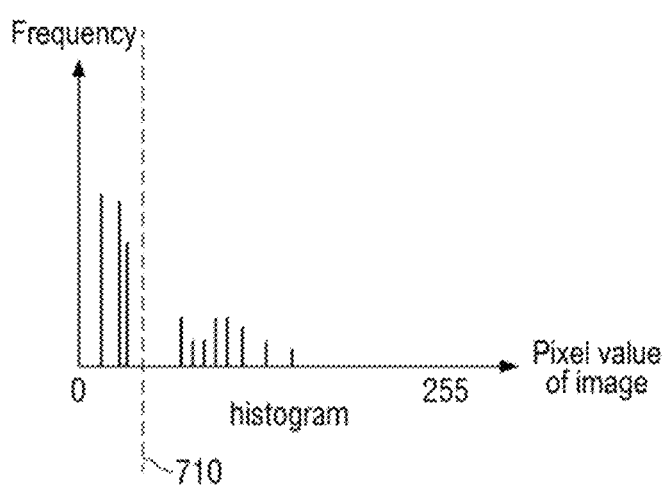

FIG. 8A
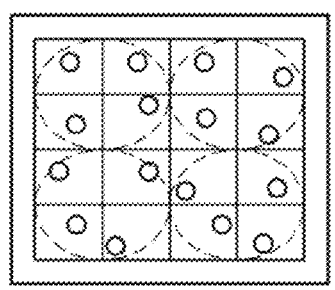
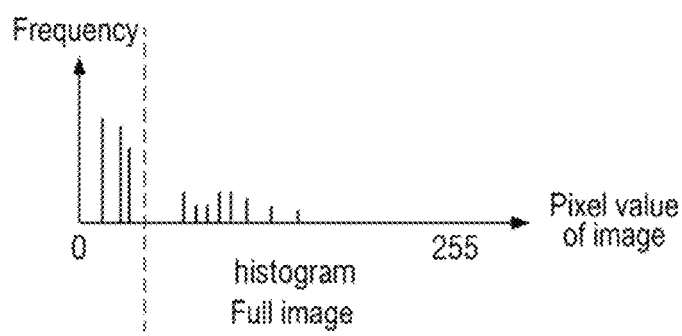

APPARATUS AND METHOD FOR CALCULATING MOTION VECTOR

CROSS-REFERENCE TO THE RELATED APPLICATION

This application claims priority from Korean Patent Application No. 10-2019-0094121 filed in the Korean Intellectual Property Office on Aug. 2, 2019, the disclosure of which is incorporated herein in its entirety by reference.

BACKGROUND

1. Field

Example embodiments of the present disclosure relate to an apparatus and method for calculating a motion vector, and more particularly to an apparatus and method for calculating a motion vector in a wide dynamic range (WDR) that synthesizes a long exposure image and a short exposure image.

2. Description of the Related Art

Wide dynamic range (WDR) technology, which synthesizes two or more images to secure a wide dynamic range, is used for blur correction in surveillance CCTV cameras and digital cameras. In order to improve image quality, many WDR technologies have been used to combine two or more images taken by applying different exposure values.

An image blur may be corrected by calculating the global motion vector between the current image and the previous image. In this case, in a system including the WRD technology combining two or more images taken by applying different exposure values, WDR synthesis is first performed to synthesize an image, and a motion vector is calculated using the combined image. Image frames with different levels of exposure may be different frames in time, and the synthesized frame image may be an image combining different image frames in time. That is, when an image is blurred, due to the position difference, a synthesized image may not be uniform for each synthesized region. When a motion vector is calculated using these synthesized images and image blur is corrected, there is a disadvantage that blur correction is not conducted in only a certain region of an image.

When blur correction is performed with long exposure image and short exposure image frames with different exposure levels prior to WDR synthesis, the frames with different exposure levels may have very different luminance components, such that motion vector detection for blur correction may be very inaccurate.

SUMMARY

One or more example embodiments provide an apparatus for calculating an accurate motion vector in a wide dynamic range WDR synthesizing a long exposure image and a short exposure image.

One or more example embodiment further provide a method of calculating an accurate motion vector in a wide dynamic range WDR synthesizing a long exposure image and a short exposure image.

According to an aspect of an example embodiment, there is provided an apparatus for obtaining a motion vector including at least one processor configured to receive a long exposure image of a current frame and a short exposure image of the current frame, and obtain a motion vector of the long exposure image of the current frame and a motion vector of the short exposure image of the current frame, wherein the processor extracts feature points in the long exposure image of the current frame based on a saturation degree of the long exposure image of the current frame, and obtain the motion vector of the long exposure image of the current frame based on a difference between the long exposure image of the current frame and a long exposure image of a previous frame, and wherein the processor extracts feature points in the short exposure image of the current frame and obtain the motion vector of the short exposure image of the current frame based on a difference between a short exposure image of the current frame and a short exposure image of a previous frame based on a saturation degree of the short exposure image of the current frame.

In the extracting the feature points in the long exposure image of the current frame, based on a number of saturated pixels in the long exposure image of the current frame being greater than or equal to a threshold value, the processor may increase a number of sub-regions included in a region of the long exposure image of the current frame, and extract feature points among the feature points of the sub-regions included in the long exposure image of the current frame by a predetermined number in an order of saturation degree of each of the sub-regions.

In the extracting the feature points in the long exposure image of the current frame, based on a number of saturated pixels in the long exposure image of the current frame being greater than or equal to a threshold value, the processor may increase a number of sub-regions included in a region of the long exposure image of the current frame, and extract feature points among the feature points of the sub-regions included in the long exposure image of the current frame by a predetermined number in an order of increasing edge strength.

The edge strength may correspond to a contrast level between adjacent pixels included in each of the sub-regions.

In the obtaining the motion vector of the long exposure image of the current frame, the processor may obtain local motion vectors in sub-regions corresponding to respective feature points in the long exposure image of the current frame, and obtains a global motion vector of the long exposure image of the current frame based on the local motion vectors.

The processor may obtain local motion vectors based on an average of a sum of absolute values of differences of pixels in blocks included in images having a same exposure level.

In the obtaining the motion vector of the short exposure image of the current frame, the processor may obtain local motion vectors in corresponding sub-regions of respective feature points in the long exposure image of the current frame, and based on a number of saturated pixels included in the short exposure image of the current frame being greater than or equal to a threshold value, the processor divides a plurality of sub-regions into sub-region sets and obtain a global motion vector based on an average of the local motion vectors of the feature points included in each of the sub-region sets.

The processor may obtain the average of the local motion vectors of the feature points included in each of the sub-region sets, for one or more sub-region set among the sub-region sets in which a number of low-saturated pixels is equal to or greater than a threshold value.

In the obtaining the motion vector of the short exposure image of the current frame, the processor may be further configured to preprocess the short exposure image of the current frame by performing gamma correction prior to extracting the feature points of the short exposure image of the current frame.

According to another aspect of an example embodiment, there is provided a method of obtaining a motion vector based on a motion vector calculation apparatus including at least one processor, the method including receiving a long exposure image of a current frame and a short exposure image of the current frame, extracting feature points included in the long exposure image of the current frame based on a saturation degree of the long exposure image of the current frame and obtaining a motion vector of the long exposure image of the current frame based on a difference between a long exposure image of the current frame and a long exposure image of a previous frame, and extracting feature points included in the short exposure image of the current frame and obtaining a motion vector of the short exposure image of the current frame based on a difference between a short exposure image of the current frame and a short exposure image of a previous frame based on a saturation degree of the short exposure image of the current frame.

The obtaining the motion vector of the long exposure image of the current frame may include increasing a number of sub-regions included in a region of the long exposure image of the current frame based on a number of saturated pixels in the long exposure image of the current frame being equal to or greater than a threshold value, and extracting feature points among the feature points of the sub-regions included the long exposure image of the current frame by a predetermined number in an order of saturation degree of each of the sub-regions.

The obtaining the motion vector of the long exposure image of the current frame may include increasing a number of sub-regions included in a region of the long exposure image of the current frame based on a number of saturated pixels in the long exposure image of the current frame being equal to or greater than a threshold value, and extracting feature points among the feature points of the sub-regions included in the long exposure image of the current frame by a predetermined number in an order of increasing edge strength.

The edge strength may correspond to a contrast level between adjacent pixels included in each of the sub-regions.

The obtaining the motion vector of the long exposure image of the current frame may include obtaining local motion vectors in sub-regions corresponding to respective feature points in the long exposure image of the current frame, and obtaining a global motion vector of the long exposure image of the current frame based on the local motion vectors.

The obtaining the motion vector of the long exposure image of the current frame may include obtaining local motion vectors based on an average of a sum of absolute values of differences of pixels in blocks between long exposure images.

The obtaining the motion vector of the short exposure image of the current frame may include obtaining local motion vectors in sub-regions corresponding to respective feature points in the long exposure image of the current frame, and dividing a plurality of sub-regions into sub-region sets and obtaining a global motion vector of the short exposure image of the current frame based on an average of the local motion vectors of the feature points included in each of the sub-region sets, based on a number of saturated pixels included in the short exposure image being equal to or greater than a threshold value.

In obtaining the global motion vector of the short exposure image of the current frame, the average of the local motion vectors of the feature points included in each of the sub-region sets among the sub-region sets may be obtained for only a sub-region set in which the number of low-saturated pixels is equal to or greater than a threshold value.

The obtaining the motion vector of the short exposure image of the current frame may include preprocessing the short exposure image of the current frame by performing gamma correction prior to extracting the feature points.

The method may further include performing motion compensation for the long exposure image of the current frame based on the motion vector of the long exposure image of the current frame, and performing motion compensation for the short exposure image of the current frame based on the motion vector of the short exposure image of the current frame.

BRIEF DESCRIPTION OF THE DRAWINGS

The above and/or other aspects and features will become more apparent by describing in detail example embodiments thereof with reference to the attached drawings, in which:

FIGS. 5 to 8B are views explaining the processes of calculating a motion vector in the apparatus for calculating a motion vector according to an example embodiment;

DETAILED DESCRIPTION OF THE EMBODIMENTS

Figure 1:
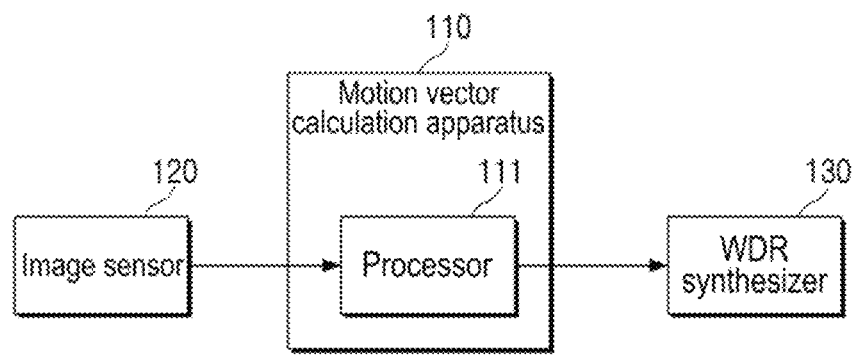
FIG. 1 is a block diagram of an apparatus for calculating a motion vector according to an example embodiment.

The example embodiments will be described in detail in order to allow those skilled in the art to practice the present disclosure. It should be appreciated that various example embodiments are different, but are not necessarily exclusive. For example, specific shapes, configurations, and characteristics described in an example embodiments may be implemented in another embodiment without departing from the spirit and the scope of the present disclosure. In addition, it should be understood that positions and arrangements of individual components in each disclosed example embodiments may be changed without departing from the spirit and the scope of the present disclosure. Therefore, the detailed description provided below should not be construed as being restrictive. In addition, the scope of the present disclosure is defined only by the accompanying claims and their equivalents if appropriate. Like reference numerals refer to like elements throughout the specification.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The terms used herein is for the purpose of describing example embodiments only and are not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, example embodiments will be described with reference to the accompanying drawings.

FIG. 1 is a block diagram of an apparatus for calculating a motion vector according to an example embodiment.

The motion vector calculation apparatus 110 for calculating a motion vector according to an example embodiment may include at least one processor 111 receiving a long exposure image and a short exposure image of a current frame and calculating a motion vector of the long exposure image and a motion vector of the short exposure image. The motion vector calculation apparatus 110 may further include a memory and a communication interface.

The motion vector calculation apparatus 110 may calculate a motion vector required for blur correction to correct the blur of an image created due to motion in a wide dynamic range (WDR) environment. In order to increase the accuracy in performing blur correction in the WDR environment, the motion vector calculation apparatus 11 may receive a long exposure image and a short exposure of a current frame from an image sensor 120, calculate a motion vector for respectively performing the blur correction with a long exposure image and a short exposure image of a previous frame, and performs blur correction using the motion vector, and then a WDR synthesizer 130 may perform WDR synthesis. That is, the blur correction between long exposure-short exposure images and the blur correction between short exposure-long exposure images may be performed, and then the WDR synthesis between long exposure-short exposure images may be performed.

For the blur correction between long exposure-long exposure images, feature points in the long exposure image are extracted according to the saturation degree of the long exposure image of the current frame, a motion vector of the long exposure image is calculated using a difference between the long exposure image of the current frame and the long exposure image of the previous frame.

The long exposure image may be an image having a relatively high shutter speed, and is exposed for a long time, such that the image sensor 120 receives a large amount light for a long time to obtain a relatively bright screen, where a saturation region may increase. In the saturation region, it may be more difficult to detect feature points, and it may be more difficult to calculate a motion vector. That is, as the saturation region increases, the number of feature points decreases, and thus the calculation of a motion vector may become more inaccurate. Accordingly, a region where feature points are extracted may be varied based on the saturation degree of the long exposure image to extract feature points in the long exposure image, and the motion vector of the long exposure image may be calculated using a difference between the long exposure image of the current frame from the long exposure image of the previous frame.

For the blur correction between short exposure-long exposure images, feature points may be extracted in the short exposure image, and the motion vector of the short exposure image may be calculated using a difference between a short exposure image of the current frame and the short exposure image of the previous frame.

For a short exposure image, unlike the long exposure image, a low-saturation region may increase. In the low-saturation region, noise may be relatively high, thereby decreasing the accuracy in calculating a motion vector. Therefore, a high-accuracy motion vector may be calculated from the motion vectors according to the saturation degree of the short exposure image, and the accuracy thereof may be improved.

In the blur correction between short exposure-long exposure images and the blur correction between short exposure-short exposure images, the blur correction between long exposure-long exposure images may be performed when the image of the current frame received from the image sensor 120 is a long exposure image, and the blur correction between short exposure-short exposure images may be performed when the image of the current frame received from the image sensor 120 is a short exposure image.

A detailed process of receiving a long exposure image and a short exposure image, calculating a motion vector to compensate for motion, and performing blur correction will be described as follows with reference to FIG. 2.

Figure 3:
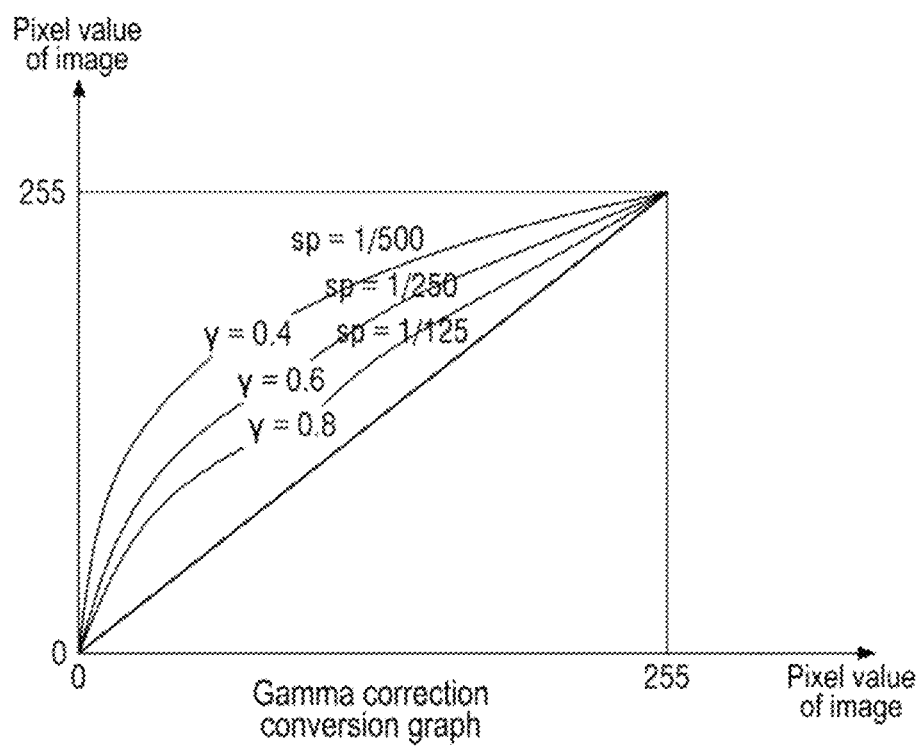
FIG. 3 is a gamma correction conversion graph according to gamma correction of an example embodiment.

The image sensor 120 may receive a long exposure image of the current frame and a short image of the current frame. Thereafter, a preprocessor 112 may perform a preprocessing on the images according to a shutter speed. In this case, the preprocessor 112 may perform a preprocessing by performing gamma correction on the short exposure image before extracting feature points. As shown in FIG. 3, gamma correction may be performed to adjust the overall brightness of the image. The short exposure image having a low shutter speed may be darker because it receives light for a shorter time. That is, in the case of a short exposure image, the lower the shutter speed, the darker the image becomes, which makes it difficult to detect motion vectors. In order to compensate for the darkness of the short exposure image, the preprocessor 112 may perform gamma correction to adjust the overall brightness of the short exposure image. In this case, the gamma correction may be adaptive gamma correction in which gamma values increase as the shutter speed, as an input, decreases. When the gamma correction is performed, an image becomes brighter, but noise also increases. Therefore, 2-D noise reduction may be performed on the gamma-corrected image.

After the preprocessing is performed, the long exposure image and the short exposure image of the current frame are stored in the memory 116 to calculate a motion vector in the subsequent frame. The memory 116 may also store the long exposure image and the short exposure image of the previous frame.

Figure 2:
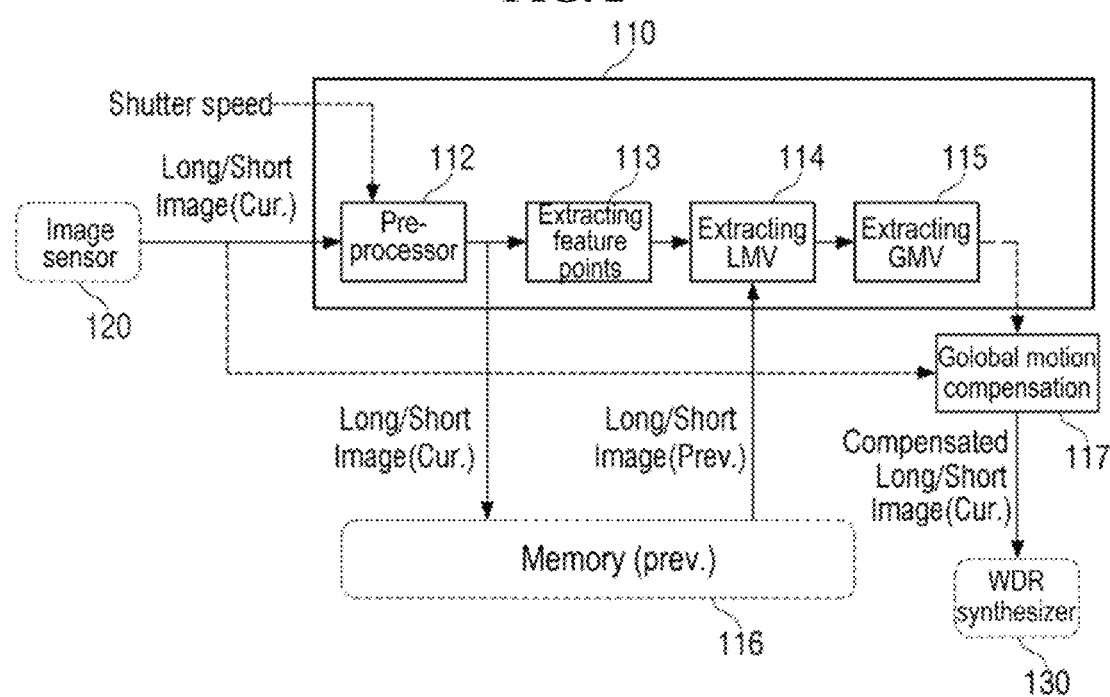
FIG. 2 is a block diagram showing the processes of calculating a motion vector performed by the apparatus for calculating a motion vector according to an example embodiment.
Figure 4A:
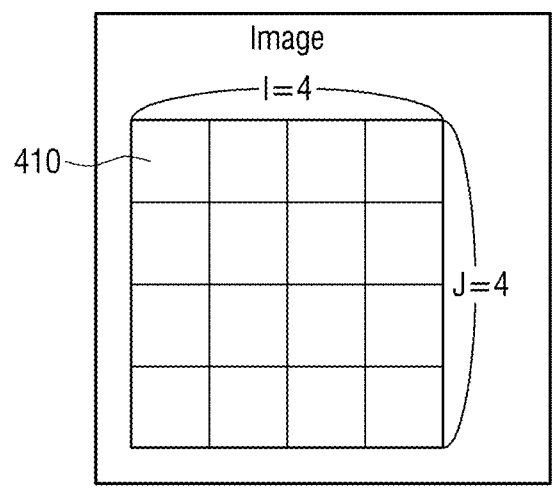
FIGS. 4A and 4B are views schematically showing the processes of calculating a motion vector.
Figure 4B:
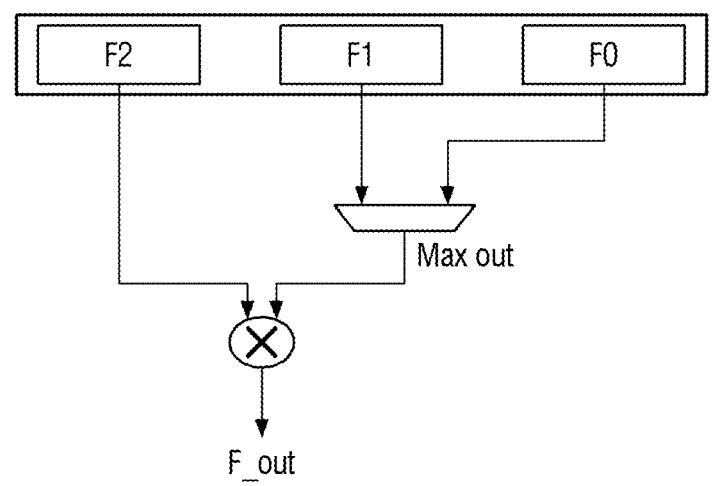

Thereafter, feature point extraction is performed as illustrated in block 113 in FIG. 2. When performing blur correction requiring the global motion vector and not the motion vectors of objects, in order to reduce the amount of operation, a method of extracting a motion vector using block matching on the feature points of an image is used. In the local motion vector (LMV), in order to reduce the amount of operation, feature points of an image are extracted, and then the feature points are block-matched. As shown in FIG. 4A, detection of feature points is performed in rectangular sub-regions 410. One feature point per sub-region of an image is first extracted to extract K feature points from K (I×J) sub-regions. As shown in FIG. 4B, for detecting feature points, edge strengths (contrast level) F_out of image pixels in the sub-region are extracted by an edge detection filter, and the maximum strength value is selected as the feature point FP of the sub-region.

After the extraction of feature points, the long exposure image and the short exposure image of the previous frame are read from the memory 116 to extract local motion vectors (LMV) between long exposure-long exposure images of the current frame and the previous frame and between short exposure-short exposure images of the current frame and the previous frame as illustrated in block 114. A global motion vector (GMV) is extracted from the extracted local motion vectors (LMV) as illustrated in block 115.

Thereafter, the motion compensation of the long exposure image and short exposure image of the current frame is performed as illustrated in block 117, and the motion-compensated long exposure image and short exposure image of the current frame are transmitted to a WDR synthesizer 130 to perform WDR synthesis to which blur correction is applied.

In the extraction of feature points in the long exposure image, the position of the pixel from which the feature point is extracted may be set differently according to the saturation degree of the long exposure image.

For example, when the number of saturated pixels in the long exposure image is greater than or equal to the threshold value, in order to extract the feature points of the long exposure image, the number of sub-regions included in the long exposure image may be increased. Among the feature points of the sub-regions, the feature points of the long exposure image may be extracted by a predetermined number in the order of saturation degree of each sub-region.

Figure 5:
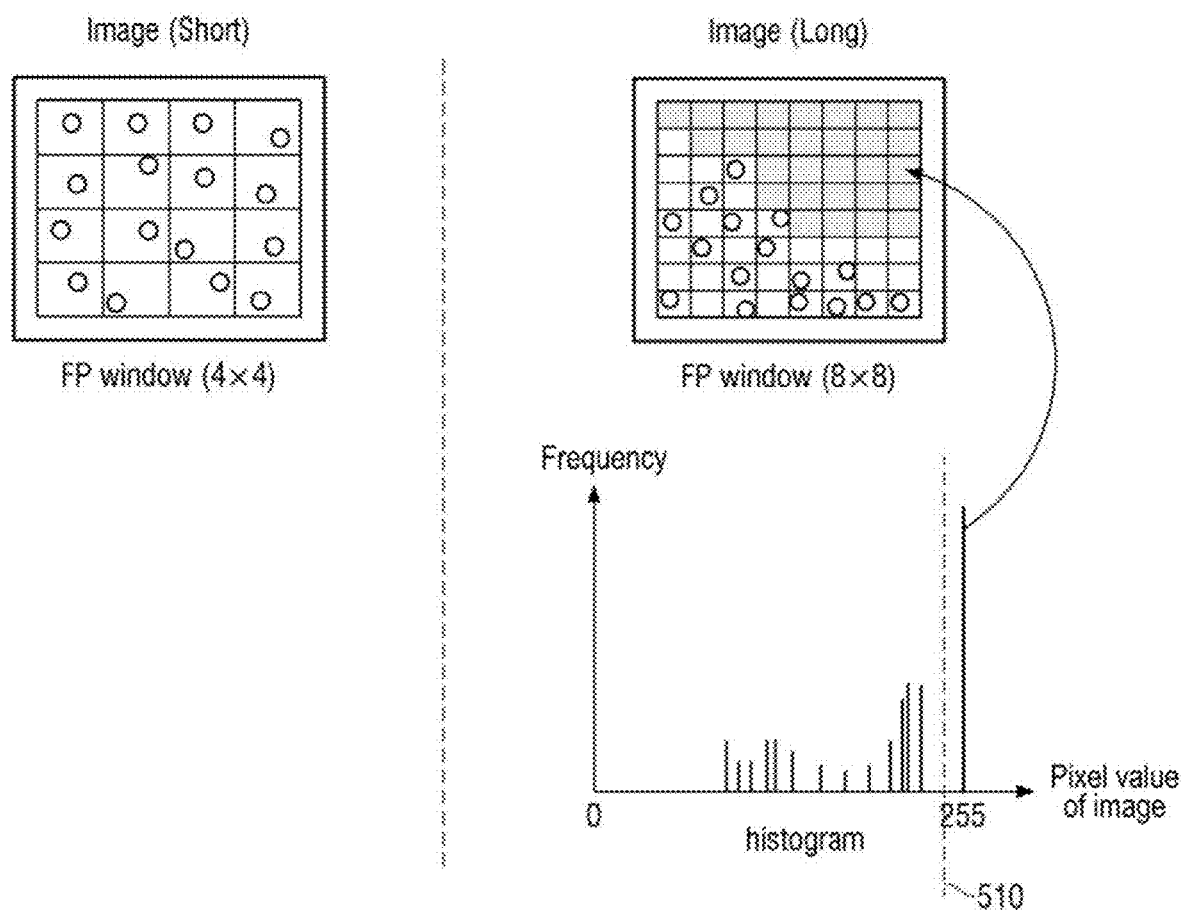

After generating a histogram for a long exposure image, when the total number of saturated pixels in the image is equal to or greater than the threshold value, the number of feature point (FP) windows included in the sub-regions increase. Generally, in the case where sub-regions of 4×4 are used, as shown in FIG. 5, when the frequency of pixels 510 having a histogram value of 255 is equal to or higher than the threshold value, sub-regions of 4×4 is increased to sub-regions of 8×8. Thereafter, a predetermined number of feature points of the long exposure image may be extracted in the order of saturation degree of each sub-region. In this case, 64 feature points of the sub-region may be aligned in the order of increasing edge strength, to extract 16 feature points as the feature points of the long exposure image. The criterion for saturation may be based on the histogram value of 255, or may be based on an image sensing environment or a user's setting. In this way, the feature point may be used for a long exposure image in a region other than the saturated region, such that the number of feature points may be maintained, and as a result, the accuracy of a motion vector may be improved.

In the case of a short exposure image, since there are few or no saturated pixels, feature points may be extracted without variably adjusting the number of sub-regions. For example, as shown in FIG. 5, feature points are extracted from sub-regions of 4×4.

When feature points are extracted from the long exposure image and short exposure image of the current frame, a motion vector may be calculated. First, a local motion vector (LMV) in each sub-region is calculated, and a global motion vector (GMV) is calculated based on the local motion vector.

Figure 6:
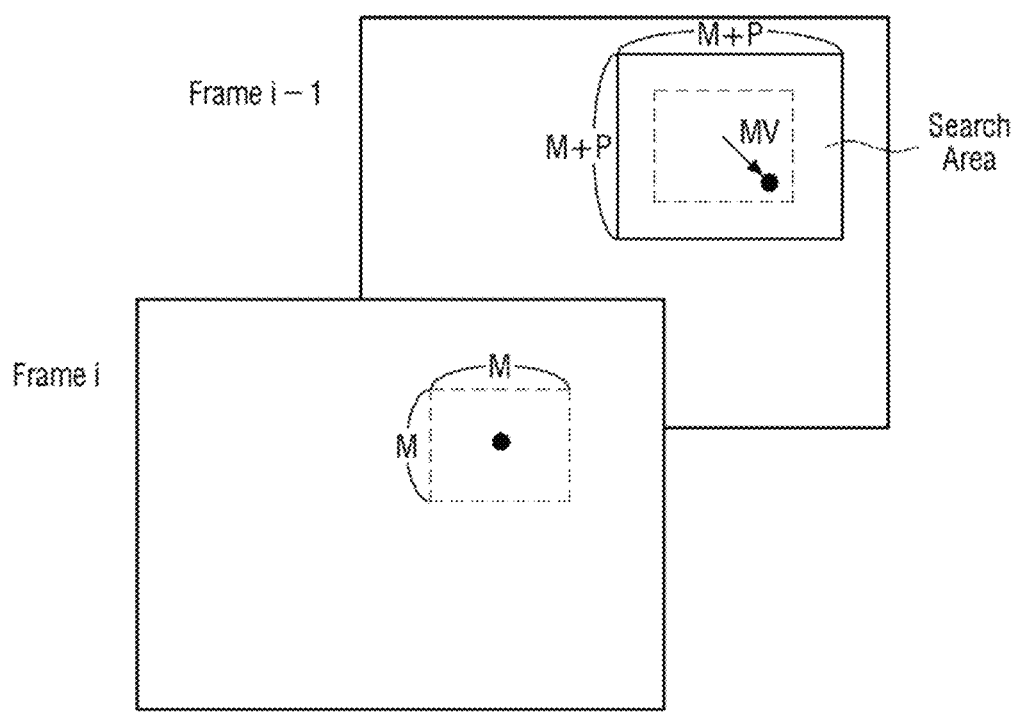

When the feature point of the current frame is the same as that in FIG. 6, a local motion vector indicating the direction of movement and the degree of movement between feature points in the previous frame is calculated. The local motion vector is calculated by calculating a difference between a block of the current frame and a block of the previous frame using the mean absolute difference (MAD) which is an average of sum of absolute values of differences of pixels in the blocks.

The global motion vector is calculated using the local motion vectors calculated in the respective sub-regions. In this case, the global motion vector is calculated using a histogram value or a median value of K local motion vectors.

Through the above process, local motion vectors in the respective sub-regions of feature points in the long exposure image are calculated, and a global motion vector of the long exposure image is calculated from the local motion vectors.

In the calculation of motion vectors of the short exposure image, local motion vectors in the respective sub-regions of feature points in the short exposure image are calculated. In this case, when the number of low-saturated pixels in the short exposure image is equal to or greater than the threshold value, a plurality of sub-regions are divided into sub-region sets, and the global motion vector of the short exposure image using an average of local motion vectors of feature points included in each of the sub-region sets.

In the case of a short exposure image, when a relatively high number of low-saturated pixels are included, greater amount of noise may be included, and thus the accuracy of local motion vectors may be degraded. Therefore, when the number of low saturated pixels in the short exposure image is equal to or greater than the threshold value, one local motion vector is recalculated using the average of adjacent local motion vectors without directly using the local motion vectors in each sub-region. The recalculated local motion vector may be used to calculate a global motion vector. In the determination of low-saturated pixels, as shown in FIG. 7, when the frequency of pixels below the reference 710 for determining the low-saturated pixels using the histogram of the short exposure image is equal to or greater than the threshold value, one local motion vector 720 may be calculated, for example, from 4 or 8 adjacent local motion vectors 721 to 724.

In the calculation of local motion vectors in the short exposure image, as shown in FIG. 8A, local motion vectors may be recalculated in all of the sub-regions. As shown in FIG. 8A, all of the sub-regions may be divided into sub-pixel sets, and local motion vectors of the short exposure image may be recalculated using the average of the local motion vectors of the feature points included in each sub-region set. In this case, the number of finally calculated motion vectors may be significantly decreased. When the number of local motion vectors is small, the accuracy in calculating the global motion vector may decrease.

Figure 8B:
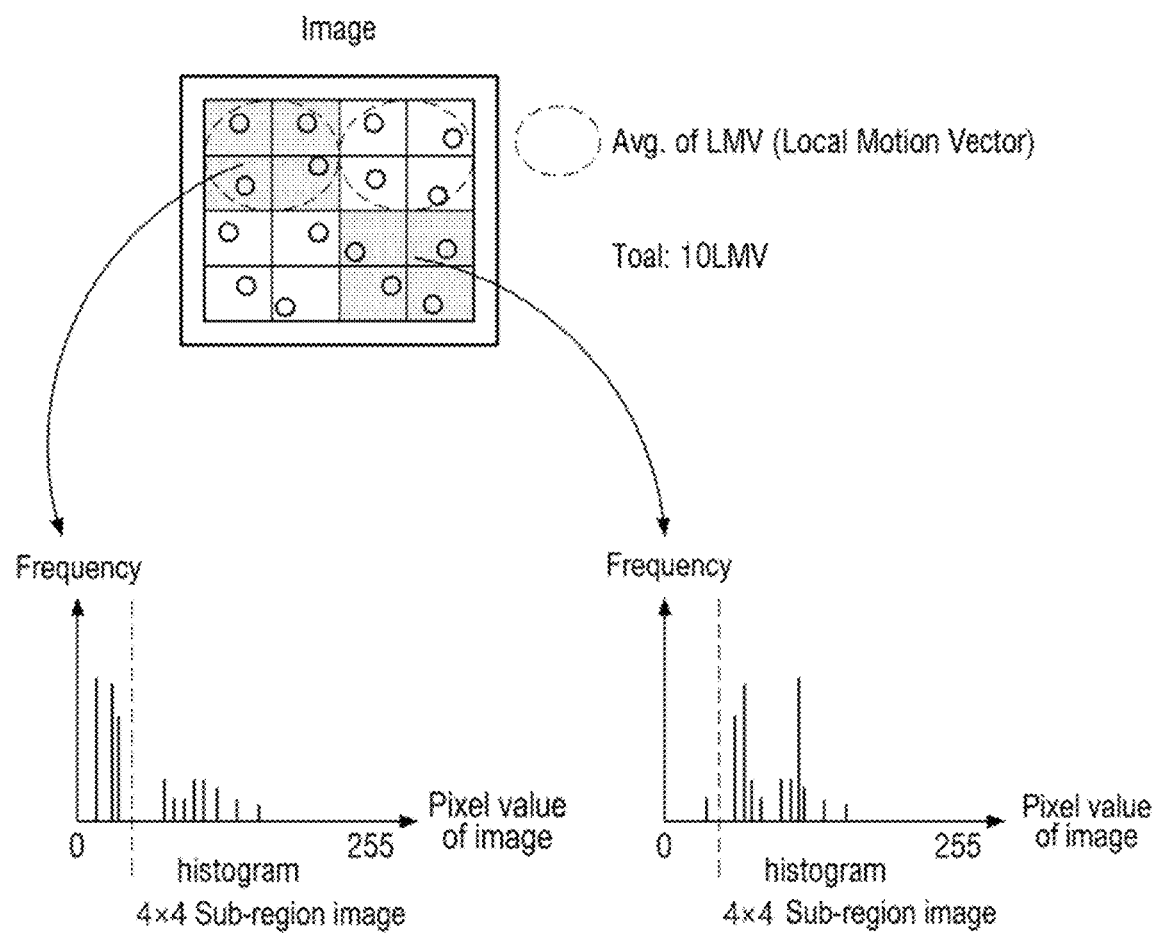

As shown in FIG. 8B, when the number of low-saturated pixels in sub-regions capable of forming sub-pixel sets without dividing all of the sub-regions into sub-region sets is equal to or less than the threshold value, the corresponding sub-regions may not form sub-region sets, and only the sub-regions where the number of low-saturated pixels is equal to or greater than the threshold value may form sub-region sets. Through this, it may be possible to prevent or reduce the reduction of the number of unnecessary local motion vectors. Thus, in regions that are difficult to use to calculate a global motion vector according to low-saturated pixels, local motion vectors according to sub-region sets are recalculated, and it is possible to make full use of the local motion vectors in sub-regions that may be sufficiently used to calculate the global motion vector, without recalculation, such that it is possible to increase accuracy in the calculation of the global motion vector.

When the motion vectors of the long exposure image and the short exposure image are calculated, motion compensation for the long exposure image is performed using the motion vectors of the long exposure image, and motion compensation for the short exposure image is performed using the motion vectors of the short exposure image, thereby performing blur correction. Thereafter, the WDR synthesizer 130 may generate a WDR image whose blur is corrected by performing WDR synthesis.

Figure 9:
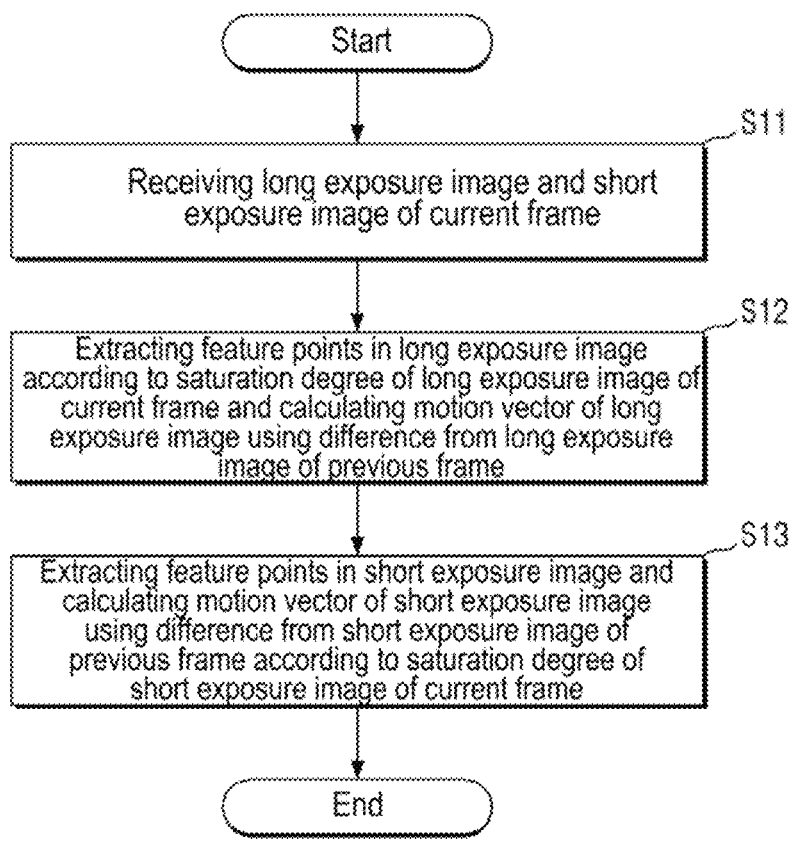
FIG. 9 is a flowchart of a method of calculating a motion vector according to an example embodiment.

FIG. 9 is a flowchart of a method of calculating a motion vector according to an example embodiment, and FIGS. 10 to 15 are flowcharts of methods of calculating a motion vector according to other example embodiments. Since a detailed description of each step of FIGS. 9 to 15 corresponds to the detailed description of the motion vector calculation apparatus 110 of FIGS. 1 to 8, hereinafter, a redundant description will be briefly described. Each step of FIGS. 9 to 15 may be performed by at least one processor included in the motion vector calculation apparatus.

In step S11, a long exposure image and a short exposure image of a current frame are received. In step S12, feature points are extracted from the long exposure image according to the saturation degree of the long exposure image of the current frame, and a motion vector of the long exposure image is calculated using a difference between the long exposure image of the current frame and the long exposure image of the previous frame.

Figure 10:
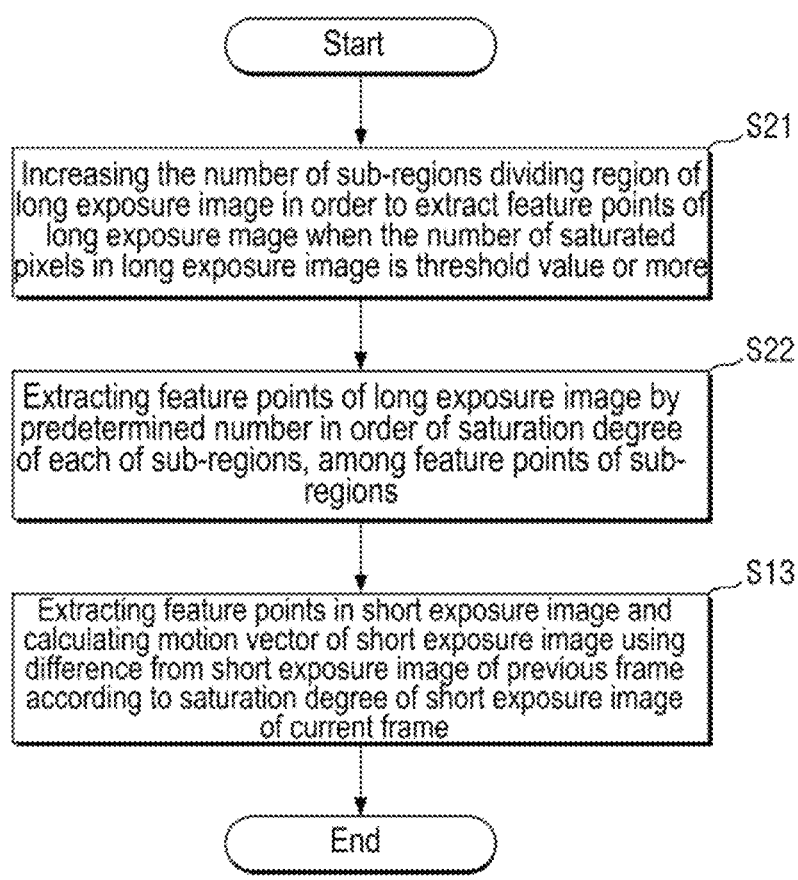
FIGS. 10, 11, 12, 13, 14, and 15 are flowcharts of methods of calculating a motion vector according to example embodiments.
Figure 11:
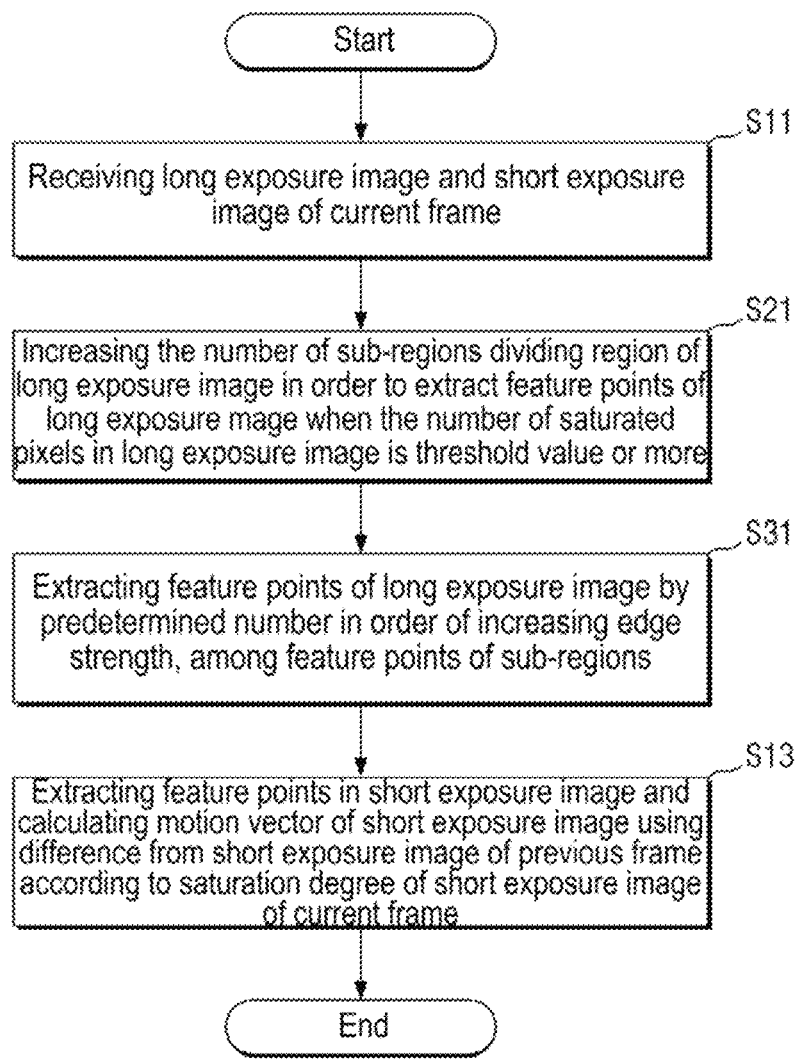

In step S12, calculation of the motion vector of the long exposure image may be performed as steps S21 and S22 in FIG. 10. In step 21, when the number of saturated pixels in the long exposure image is equal to or greater than the threshold value, the number of sub-regions included in the long exposure image may be increased in order to extract the feature points of the long exposure image, and in step S22, among the feature points of the sub-regions, a predetermined number of feature points of the sub-regions may be extracted as the feature points of the long exposure image in the order of saturation degree of each sub-region. As illustrated in FIG. 11, in step S31, among the feature points of the sub-regions, a predetermined number of feature points of the sub-regions may be extracted as the feature points of the long exposure image in the order of increasing edge strength.

Figure 12:
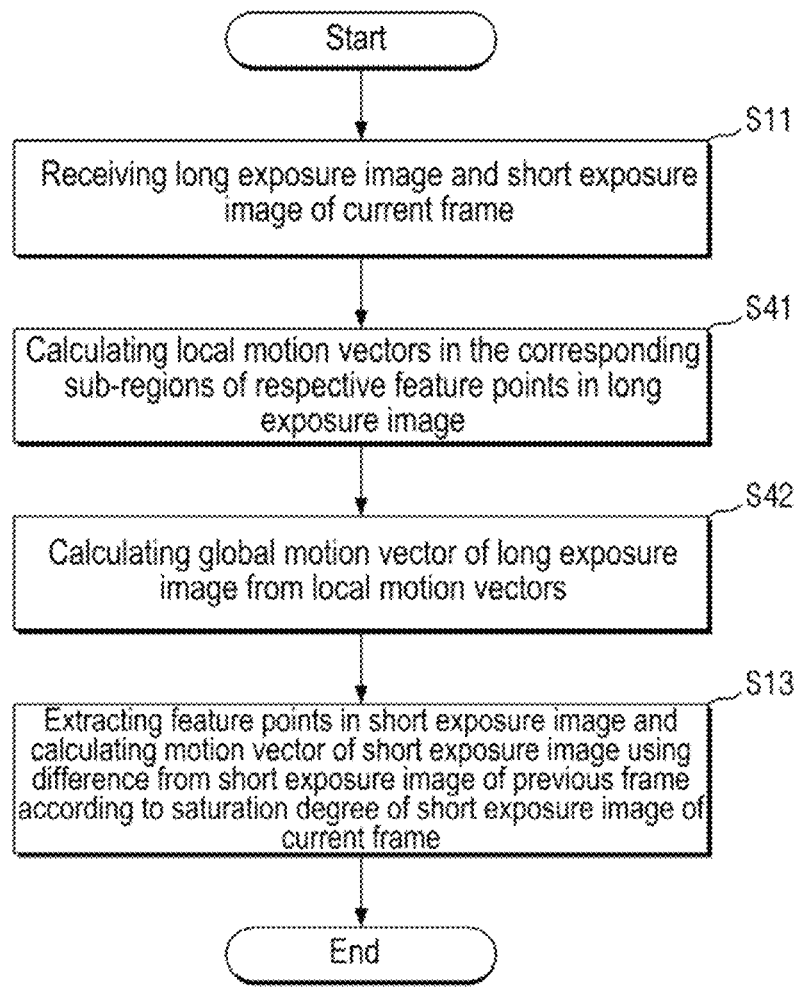

As illustrated in FIG. 12, in step S12, calculation of the motion vector of the long exposure image in FIG. 10 may include steps S41 and S42. In step S41, local motion vectors of the corresponding region of the respective feature points in the long exposure image may be calculated. In this case, the local motion vectors may be calculated between long exposure images using an average of the sum of absolute values of differences of pixels in blocks. The local motion vectors may be calculated between the short exposure images using an average of the sum of absolute values of differences of pixels in blocks. Then, in step S42, the global motion vector of the long exposure image may be calculated from the local motion vectors.

After or while performing step S12 of calculating the motion vector of the long exposure image, in step S13, feature points are extracted from the short exposure image, and the motion vector of the short exposure image is calculated using a difference between the short exposure image of the current frame and the short exposure image of the previous frame according to the saturation degree of the short exposure image of the current frame.

Figure 13:
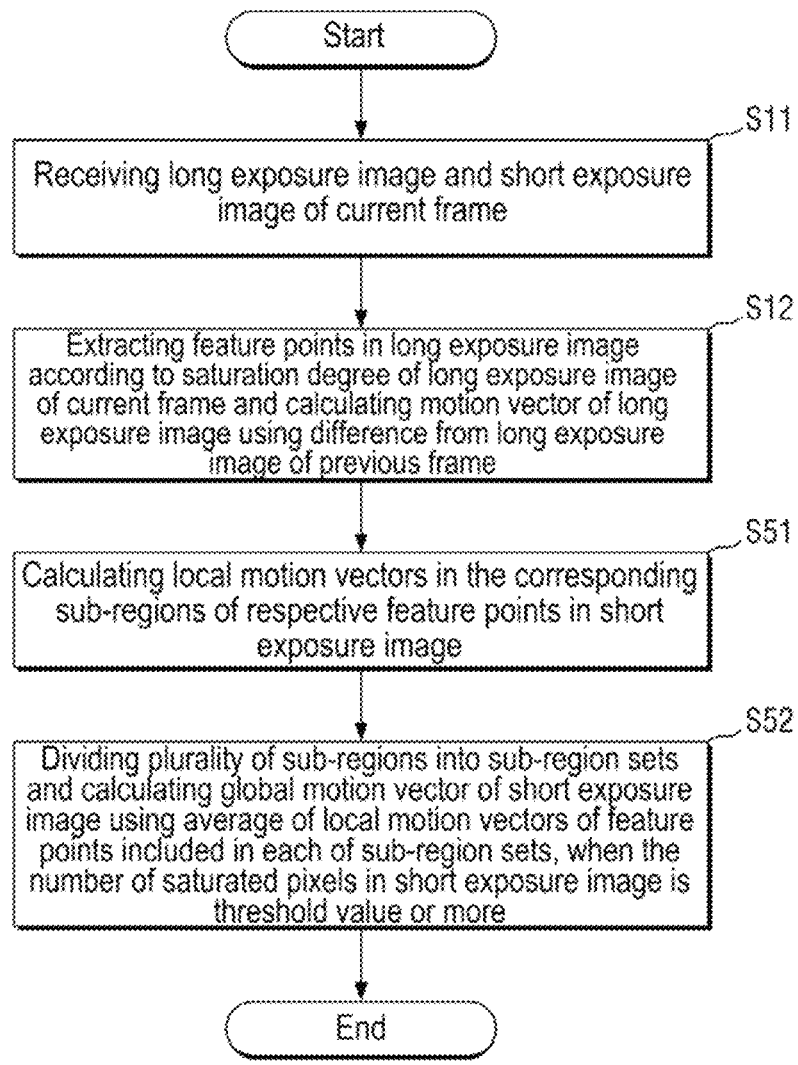

Step S13 in FIG. 10 may be performed as steps S51 and S52 in FIG. 13. In step S51, local motion vectors in the corresponding sub-region of the respective feature points in the short exposure image are calculated. In step S52, when the number of low-saturated pixels in the short exposure image is equal to or greater than the threshold value, a plurality of sub-regions are divided into sub-region sets, and the global motion vector of the short exposure image may be calculated using an average of local motion vectors of feature points included in each of the sub-region sets. Further, in step S52, among these sub-region sets, a global motion vector of the short exposure image may be calculated by calculating an average of the local motion vectors of the feature points included in each of the sub-region sets only for the sub-region set in which the number of low-saturated pixels is equal to or less than the threshold value.

Figure 14:
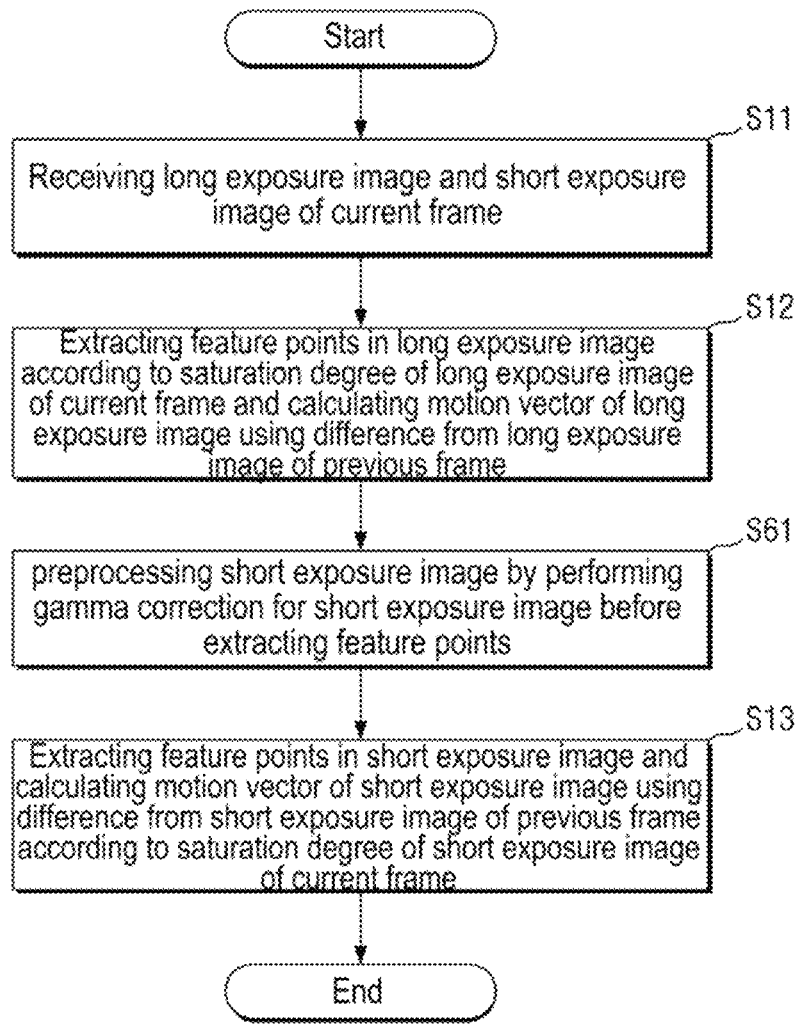

Further, as illustrated in FIG. 14, step S61 of preprocessing the short exposure image by performing gamma correction for the short exposure image prior to extracting the feature points may further be performed.

Figure 15:
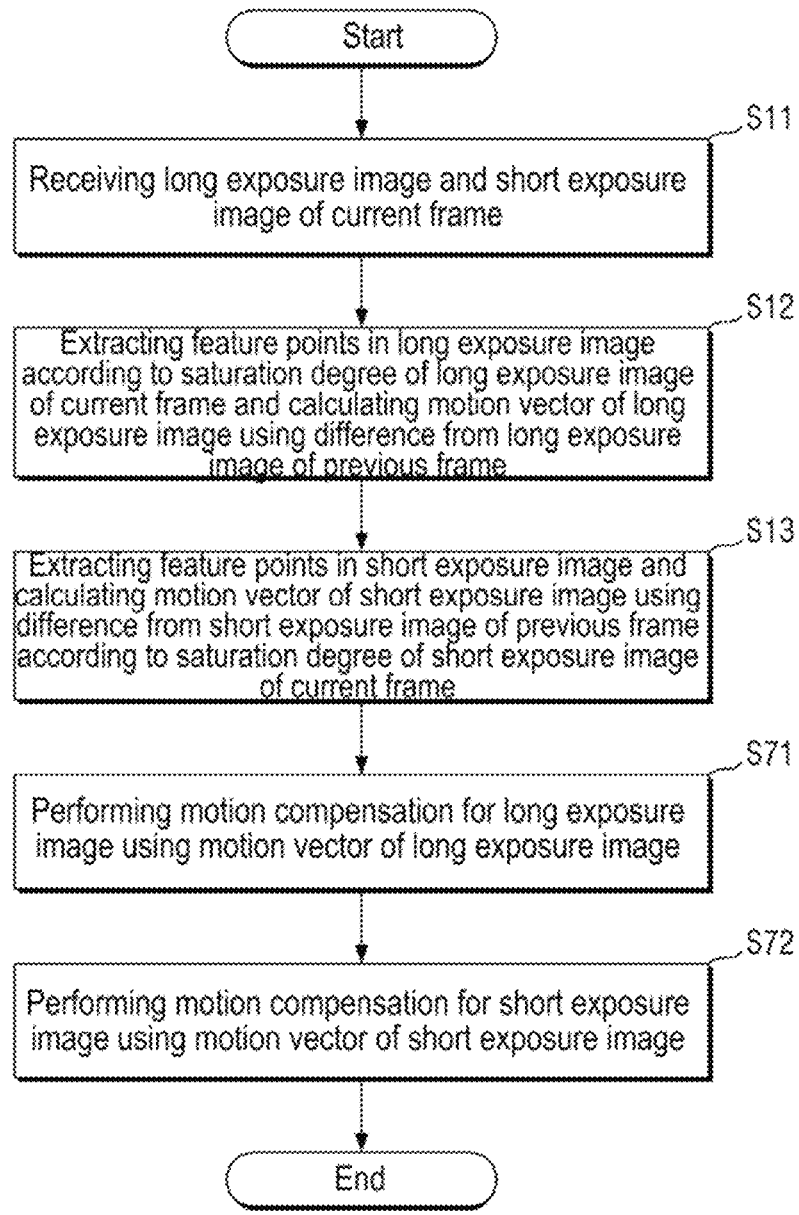

Further, as illustrated in FIG. 15, step S71 of performing motion compensation for the long exposure image using the motion vector of the long exposure image, and step S72 of performing motion compensation for the short exposure image using the motion vector of the short exposure image may further be performed.

The above example embodiments may be implemented in the form of program commands that may be executed through various computer means and recorded in a computer-readable recording medium. The computer-readable recording medium may include program instructions, data files, data structures, and the like, alone or in combination. The program commands recorded in the medium may be those specially designed and configured for the present disclosure or may be those available to those skilled in the art of computer software. Examples of the computer-readable recording medium may include magnetic media such as hard disk, floppy disk, and magnetic tape; optical recording media such as CD-ROM and DVD, magneto-optical media such as floptical disk, and hardware devices configured to store and execute program commands, such as ROM, RAM, and flash memory. The computer-readable recording medium may be implemented in the form of a carrier wave (for example, transmission through internet). The computer readable recording medium may be distributed over a networked computer system, so that computer-readable codes may be stored and executed in a distribution manner. The functional programs, codes and code segments for implementing the present disclosure may be easily deduced by programmers skilled in the art. Examples of program commands include not only machine language codes such as those made by a compiler but also high-level language codes that may be executed by a computer using an interpreter or the like. The above-described hardware devices may be configured to operate as one or more software modules to perform the operations of the present disclosure, and the reverse thereof is possible.

At least one of the components, elements, modules or units (collectively "components" in this paragraph) represented by a block in the drawings, such as the processor 111 and/or the WDR synthesizer 130 in FIG. 1, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

According to the example embodiments, it is possible to increase the accuracy of calculation of a motion vector for blur correction.

While example embodiments have been disclosed for illustrative purposes, those skilled in the art will appreciate that various modifications, additions and substitutions are possible, without departing from the scope and spirit as disclosed in the accompanying claims.

What is claimed is:

1. An apparatus for obtaining a motion vector comprising:
at least one processor configured to receive a long exposure image of a current frame and a short exposure image of the current frame, and obtain a motion vector of the long exposure image of the current frame and a motion vector of the short exposure image of the current frame,
wherein the processor is configured to extract feature points in the long exposure image of the current frame based on a saturation degree of the long exposure image of the current frame, and obtain the motion vector of the long exposure image of the current frame based on a difference between the long exposure image of the current frame and a long exposure image of a previous frame,
wherein the processor is configured to extract feature points in the short exposure image of the current frame, and obtain the motion vector of the short exposure image of the current frame based on a difference between a short exposure image of the current frame and a short exposure image of a previous frame based on a saturation degree of the short exposure image of the current frame, and
wherein, in the extracting the feature points in the long exposure image of the current frame, based on a number of saturated pixels in the long exposure image of the current frame being greater than or equal to a threshold value, the processor is configured to increase a number of sub-regions included in a region of the long exposure image of the current frame, and extract feature points among the feature points of the sub-regions included in the long exposure image of the current frame.

2. The apparatus of claim 1, wherein the processor is configured to extract the feature points among the feature points of the sub-regions included in the long exposure image of the current frame, by a predetermined number in an order of saturation degree of each of the sub-regions.

3. The apparatus of claim 1, wherein the processor is configured to extract the feature points among the feature points of the sub-regions included in the long exposure image of the current frame, by a predetermined number in an order of increasing edge strength.

4. The apparatus of claim 3, wherein the edge strength corresponds to a contrast level between adjacent pixels included in each of the sub-regions.

5. The apparatus of claim 1, wherein, in the obtaining the motion vector of the long exposure image of the current frame, the processor is configured to obtain local motion vectors in sub-regions corresponding to respective feature points in the long exposure image of the current frame, and obtain a global motion vector of the long exposure image of the current frame based on the local motion vectors.

6. The apparatus of claim 1, wherein the processor is configured to obtain local motion vectors based on an average of a sum of absolute values of differences of pixels in blocks included in images having a same exposure level.

7. The apparatus of claim 1, wherein, in the obtaining the motion vector of the short exposure image of the current frame, the processor is configured to obtain local motion vectors in corresponding sub-regions of respective feature points in the long exposure image of the current frame, and
based on a number of saturated pixels included in the short exposure image of the current frame being greater than or equal to a threshold value, the processor is configured to divide a plurality of sub-regions into sub-region sets and obtain a global motion vector based on an average of the local motion vectors of the feature points included in each of the sub-region sets.

8. The apparatus of claim 7, wherein the processor is configured to obtain the average of the local motion vectors of the feature points included in each of the sub-region sets, for one or more sub-region set among the sub-region sets in which a number of low-saturated pixels is equal to or greater than a threshold value.

9. The apparatus of claim 1, wherein, in the obtaining the motion vector of the short exposure image of the current frame, the processor is further configured to preprocess the short exposure image of the current frame by performing gamma correction prior to extracting the feature points of the short exposure image of the current frame.

10. The apparatus of claim 1, wherein the processor is further configured to perform motion compensation for the long exposure image of the current frame based on the motion vector of the long exposure image of the current frame, and perform motion compensation for the short exposure image of the current frame based on the motion vector of the short exposure image of the current frame.

11. A method of obtaining a motion vector based on a motion vector calculation apparatus comprising at least one processor, the method comprising:
receiving a long exposure image of a current frame and a short exposure image of the current frame;
extracting feature points included in the long exposure image of the current frame based on a saturation degree of the long exposure image of the current frame and obtaining a motion vector of the long exposure image of the current frame based on a difference between a long exposure image of the current frame and a long exposure image of a previous frame; and extracting feature points included in the short exposure image of the current frame and obtaining a motion vector of the short exposure image of the current frame based on a difference between a short exposure image of the current frame and a short exposure image of a previous frame based on a saturation degree of the short exposure image of the current frame, wherein the obtaining the motion vector of the long exposure image of the current frame comprises:

increasing a number of sub-regions included in a region of the long exposure image of the current frame based on a number of saturated pixels in the long exposure image of the current frame being equal to or greater than a threshold value; and extracting feature points among the feature points of the sub-regions included the long exposure image of the current frame.

12. The method of claim 11, wherein the extracting feature points among the feature points of the sub-regions included the long exposure image of the current frame is performed, by a predetermined number in an order of saturation degree of each of the sub-regions.

13. The method of claim 11, wherein the extracting feature points among the feature points of the sub-regions included in the long exposure image of the current frame is performed, by a predetermined number in an order of increasing edge strength.

14. The method of claim 13, wherein the edge strength corresponds to a contrast level between adjacent pixels included in each of the sub-regions.

15. The method of claim 11, wherein the obtaining the motion vector of the long exposure image of the current frame comprises:

obtaining local motion vectors in sub-regions corresponding to respective feature points in the long exposure image of the current frame; and obtaining a global motion vector of the long exposure image of the current frame based on the local motion vectors.

16. The method of claim 11, wherein the obtaining the motion vector of the long exposure image of the current frame comprises:

obtaining local motion vectors based on an average of a sum of absolute values of differences of pixels in blocks included in the long exposure image.

17. The method of claim 11, the obtaining the motion vector of the short exposure image of the current frame comprises:

obtaining local motion vectors in sub-regions corresponding to respective feature points in the long exposure image of the current frame, and dividing a plurality of sub-regions into sub-region sets and obtaining a global motion vector of the short exposure image of the current frame based on an average of the local motion vectors of the feature points included in each of the sub-region sets, based on a number of saturated pixels included in the short exposure image being equal to or greater than a threshold value.

18. The method of claim 17, wherein, in obtaining the global motion vector of the short exposure image of the current frame, the average of the local motion vectors of the feature points included in each of the sub-region sets among the sub-region sets is obtained for only a sub-region set in which the number of low-saturated pixels is equal to or greater than a threshold value.

19. The method of claim 11, wherein the obtaining the motion vector of the short exposure image of the current frame comprises:

preprocessing the short exposure image of the current frame by performing gamma correction prior to extracting the feature points.

20. The method of claim 11, further comprising:

performing motion compensation for the long exposure image of the current frame based on the motion vector of the long exposure image of the current frame; and performing motion compensation for the short exposure image of the current frame based on the motion vector of the short exposure image of the current frame.

* * * * *